(No Model.)  2 Sheets—Sheet 1.

T. CRANE.
GATE.

No. 254,201. Patented Feb. 28, 1882.

WITNESSES—
F. B. Townsend
Thomas A. Banning

INVENTOR—
Thomas Crane,
by P. C. Dyrenforth,
Attorney.

(No Model.) 2 Sheets—Sheet 2.

T. CRANE.
GATE.

No. 254,201. Patented Feb. 28, 1882.

Witnesses
F. B. Townsend
Thomas A. Banning

Inventor
Thomas Crane,
by P. C. Dyrenforth,
Attorney.

UNITED STATES PATENT OFFICE.

THOMAS CRANE, OF FORT ATKINSON, WISCONSIN, ASSIGNOR OF ONE-HALF TO L. S. KELLOGG, OF SAME PLACE.

GATE.

SPECIFICATION forming part of Letters Patent No. 254,201, dated February 28, 1882.

Application filed April 14, 1881. (No model.)

*To all whom it may concern:*

Be it known that I, THOMAS CRANE, a citizen of the United States, residing at Fort Atkinson, in the county of Jefferson and State of Wisconsin, have invented certain new and useful Improvements in Gates; and I hereby declare the following to be a full, clear, and exact description thereof, reference being had to the accompanying drawings, of which—

Figure 1:
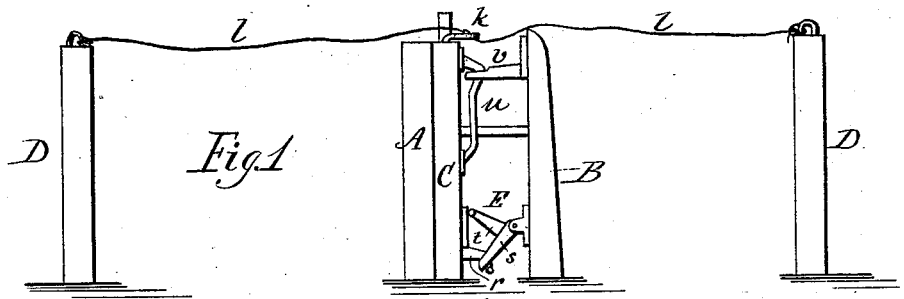
Figure 2:
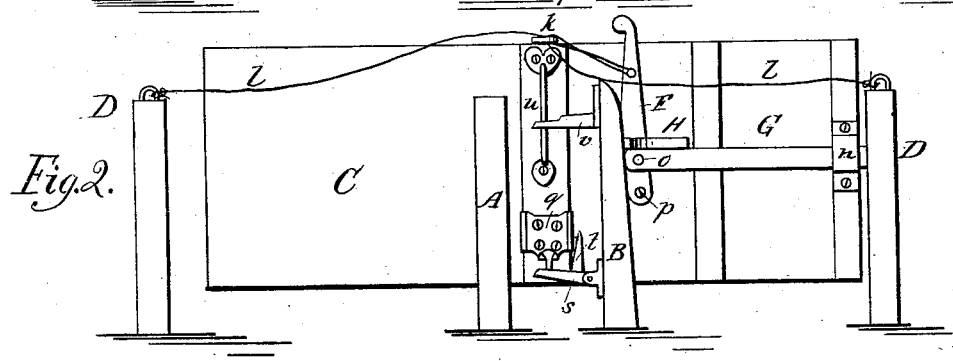
Figure 3:
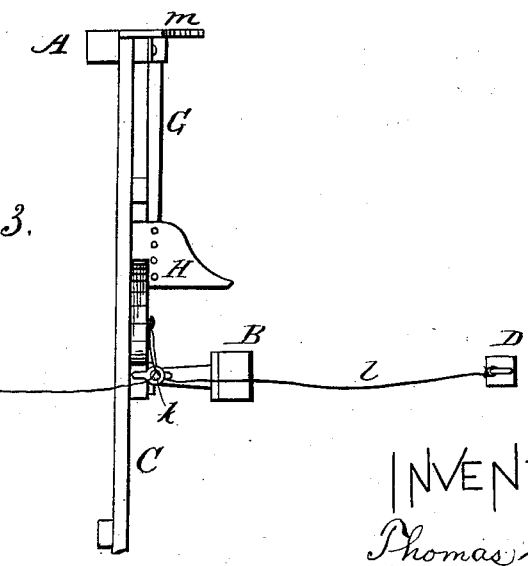
Figure 4:
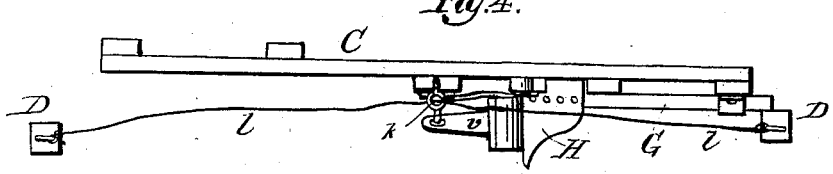
Figure 5:
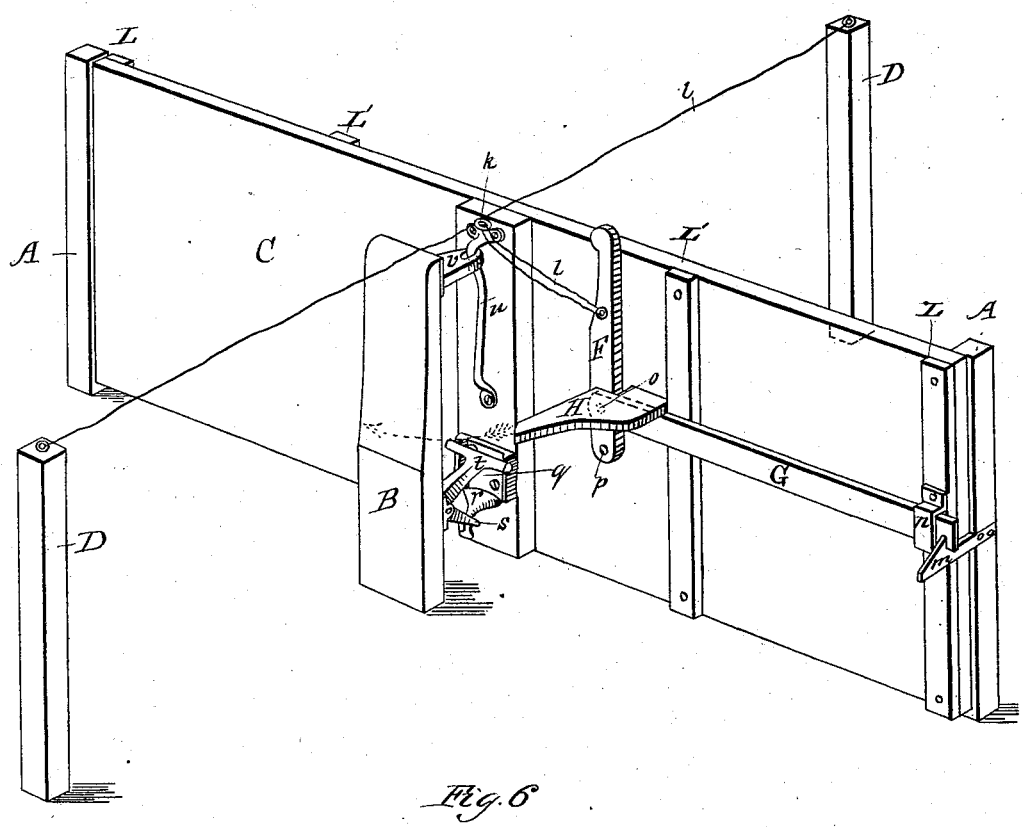
Figure 6:
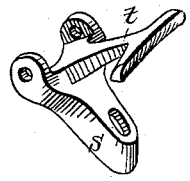

Figure 1 is an end elevation of my gate and its various attachments, showing the gate closed; Fig. 2, a similar view, showing the gate open; Fig. 3, a plan view of the gate and its attendant parts closed, as in Fig. 1; Fig. 4, a plan view of the same open, as in Fig. 2; Fig. 5, a perspective view of my gate, and Fig. 6 a detail view.

My invention relates especially to driveway-gates, although many of the features which I shall describe are applicable to small gates for pedestrians, the changes of construction, if any, required to adapt it from the former to the latter purpose being in the way of omissions, and not of additions.

The objects which I aim to accomplish are, briefly, to adapt the gate to be opened and closed from either direction without the necessity of the driver's alighting for the purpose, the opening being effected by the horse breasting against the gate and the closing being effected automatically; and also to provide the said gate with a latching device adapted to be unfastened by the driver without alighting.

In the drawings, A A are fence-posts at each side of the driveway, and B a post firmly embedded in the ground midway between the two, but a little out of line with them.

C is the gate, pivoted at its center to the post B, and D D two posts, also embedded in the ground, in line with the post B and at right angles with the posts A. The gate C is made long enough to admit of two driveways, one at each side of the center, and is constructed of boards placed close together lengthwise of the gate, and secured by means of at least five cross-bars, one, K, being bolted across the center of the gate and made thicker than the others; one, L, at each end, and another, L', midway between each end cross-bar and the central one, K. It will be observed that one smooth side is necessary to drive against for each driveway, and to accomplish this the end and intermediate cross-bars, L and L', are placed upon one side for one half of the gate and on the opposite side for the other half. This construction affords to the gate a close and even side to be driven against for each driveway, and provides against injury to gate, beast, or vehicle while passing through. The gate, moreover, has the same surface measurement each side of the center, and thereby gives a perfect balance in the wind, without which it would be entirely inoperative when the wind blows. In addition to this, by having the gate hung at its center and evenly balanced, as described, the strain upon the hinges is reduced to the minimum, whereby the gate swings with the utmost ease and smoothness, and also the highest degree of durability is attained. The central cross-bar, K, is connected to the post B by means of the hinge E at the bottom and the bracket $v$ and pintle $u$ at the top.

The hinge E is the same as the one described and claimed in Letters Patent of the United States No. 218,494, granted to me August 12, 1879, and consists, as stated in substance in the specification of my said Letters Patent, of a bracket, $t$, journaled to the supporting-post, and having the rigid link $s$ projecting from it at right angles, said link being provided with an eye at its outer extremity, which receives a pintle, $r$, projecting outward and downward from a plate, $q$, which is secured to the gate. The opening of the gate throws the edge of the plate $q$ against the bracket $t$, and causes the said plate as it turns on its axis to force the bracket backward, and thus to elevate the link $s$, and with it the gate. In this way the gate as it is opened is carried clear of the ground, whereby all obstructions—such as snow and ice—are avoided. The gate, upon being released, descends by its own gravity, the pressure of the bracket $t$ against the plate $q$ incidentally closing it. As the plate rises and falls the pintle $u$ slides freely up and down in an eye in the end of the bracket $v$, said pintle consisting simply of a guide-rod with bent ends, to hold it out of contact with the gate, and secured to the latter in a vertical position, as shown.

It is desirable in a great majority of cases to have the gate provided with a latch; but it is of course requisite that such latch should be adapted to be unfastened by the driver without his leaving his seat. To effect this end I have contrived the following device:

F is a lever, fulcrumed at its lower end to the face of the gate, as shown at p, and G is a sliding horizontal bar, pivoted at its end to the lever F above the fulcrum p, as shown at o. The end of the gate is provided with a guide, n, to receive the bar, and the fence-post contiguous thereto with a catch, m.

H is a cam, projecting at right angles from the inner end of the bar G, and l l two cords or chains, connecting the lever F with the posts D and passing through an eye or pulley, k, at the center of the gate, as shown. The gate being closed and latched, the driver, approaching from either side, pulls the cord l upon that side, which, acting upon the lever, draws its upper end over toward the center of the gate, and thus draws the bar G out of the catch m. The gate is then free to swing by the pressure of the animal against it. In opening, however, the cam H comes into contact with the post B, whereby the bar and lever are pushed back to their original position, and thus upon the closing of the gate the end of the bar re-enters the catch m. Other mechanism may be employed to push the bar G into position for latching— as, for example, mechanism operated by the vertical movement of the gate while opening.

To permit the gate to be held open when necessary, any suitable device for this purpose may be placed upon one of the posts D.

In the case of small gates for pedestrians a fastening may or not be employed, as preferred; but, however this may be, the gate should be allowed to swing about the center post either way and not touch the outer posts, thus affording a passage either way on each side of the center post.

What I claim as new, and desire to secure by Letters Patent, is—

1. The gate C, having the central cross-bar, K, hinged to the center post, B, and having the end cross-bars, L, and intermediate cross-bars, L', said end and intermediate cross-bars being placed on one side for one half of the gate and on the opposite side for the other half, substantially as and for the purpose set forth.

2. In combination with the posts A and B, and gate C, hinged to said post B, the latch comprising the lever F, fulcrumed at its lower end to the face of the gate, the bar G, pivoted to said lever, guide n, catch m upon the post A, and cam H upon the bar G, substantially as described.

3. In combination with the posts A and B, and gate C, hinged to said post B, and with the latch, comprising the bar G, lever F, cam H, guide n, and catch m, arranged and operating as described, the posts D, eye k upon the gate, and cords l, connecting the said posts to the lever F and passing through the said eye, substantially as set forth and shown.

THOMAS CRANE.

In presence of—
CHAS. M. PORTER,
H. A. PORTER.